United States Patent [19]

Mc Larney et al.

[11] 4,347,650
[45] Sep. 7, 1982

[54] METHOD OF MAKING MARGINLESS MULTI-LAYER CERAMIC CAPACITORS

[75] Inventors: Joseph C. Mc Larney, Portville; David J. Lightweis, Olean, both of N.Y.

[73] Assignee: AVX Corporation, Myrtle Beach, S.C.

[21] Appl. No.: 189,023

[22] Filed: Sep. 22, 1980

[51] Int. Cl.³ .............................................. H01G 4/12
[52] U.S. Cl. .................................... 29/25.42; 264/61; 361/321; 427/77
[58] Field of Search ......................... 29/25.42; 427/79; 361/321, 304; 264/61, 67

[56] References Cited

U.S. PATENT DOCUMENTS

| Re. 26,421 | 7/1968 | Rodriguez | 29/25.42 |
| 3,617,834 | 11/1971 | Rayburn | 361/321 |
| 3,654,532 | 4/1972 | Rayburn | 361/323 |
| 4,081,857 | 3/1978 | Hanold | 361/321 |
| 4,228,482 | 10/1980 | Bouchard | 361/321 |

FOREIGN PATENT DOCUMENTS 44-14980  7/1969  Japan ................................. 361/321

OTHER PUBLICATIONS

Coda "Design Considerations—For Chip Capacitors IEE Transactions" Vol. PHP 12#3 pp. 206-212 9/76—IEEE N.Y.

Primary Examiner—Elliot A. Goldberg
Attorney, Agent, or Firm—Arthur B. Colvin

[57] ABSTRACT

The present disclosure relates to a method of making a multi-layer ceramic capacitor and, in its more particular phases, to a capacitor having closely predictable tolerances. The method comprises the steps of providing or fabricating green ceramic sheets and imprinting or otherwise depositing on such sheets patterns of electrode material, the patterns each defining a continuous electrode area many times the anticipated area of the final capacitor. A multiplicity of layers of the ceramic and electrode are stacked and increments of the composite mass are cut therefrom in the direction perpendicular to the axis of elongation of the electrodes, which increments are thereafter fired, terminated and glazed or enveloped in an insulating coating whereby there are formed capacitors which are substantially marginless, i.e. do not include borders of ceramic material projecting beyond the electrode area. Preferably the capacitors are fabricated to value by severing an increment of predetermined width, finishing a capacitor therefrom and measuring its value, and thereafter sizing the subsequently severed increments as a function of the capacitance measurement derived.

6 Claims, 9 Drawing Figures

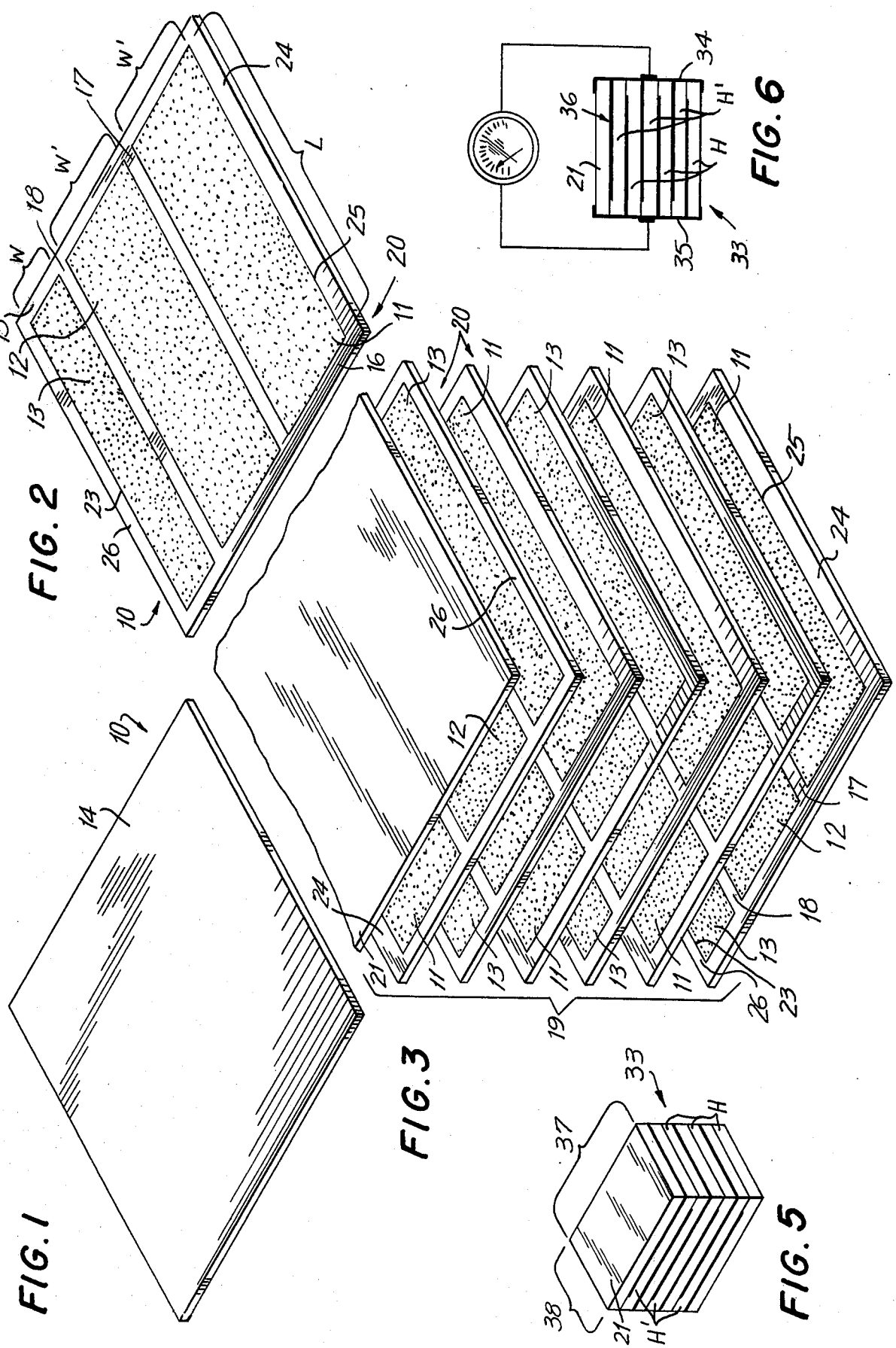

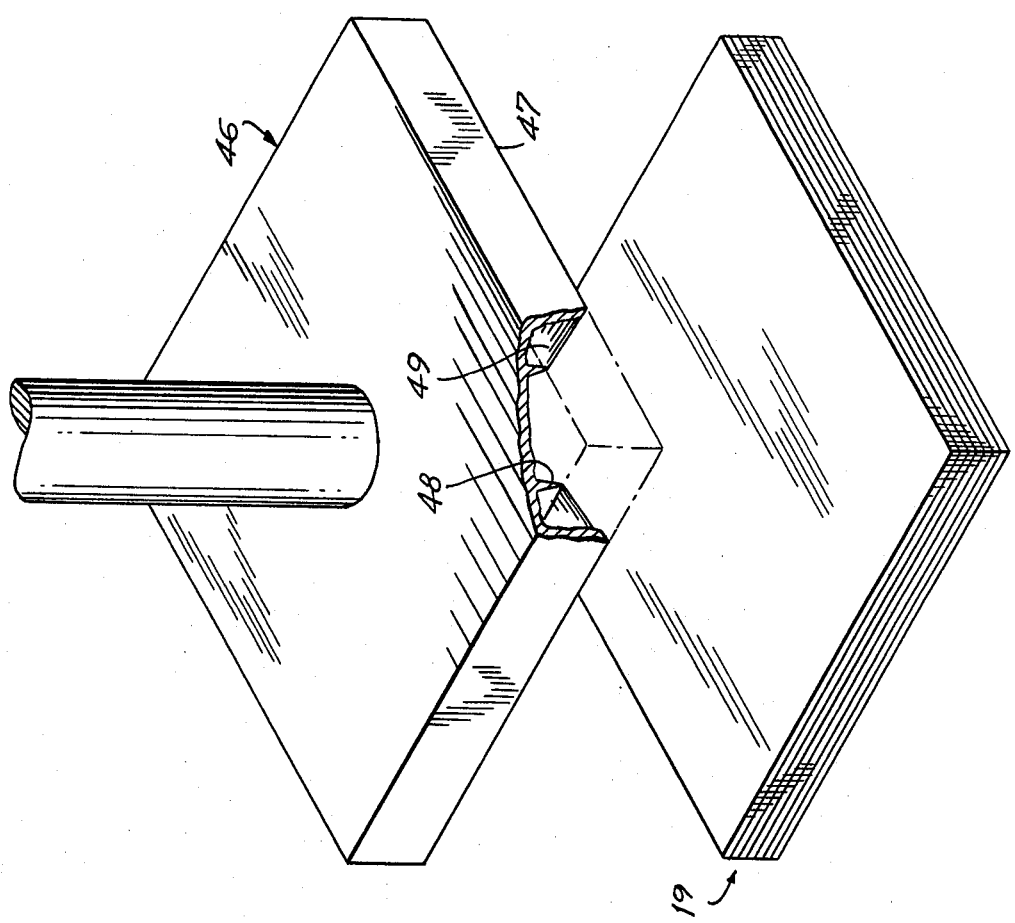
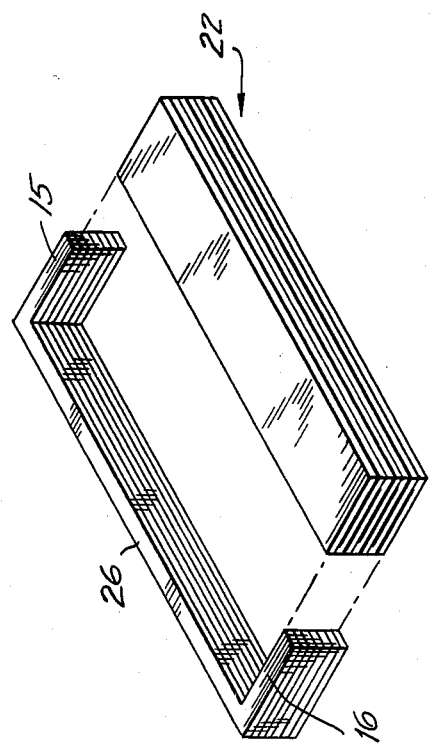
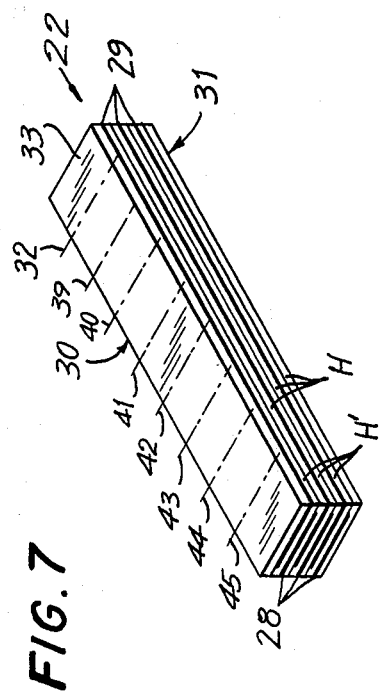

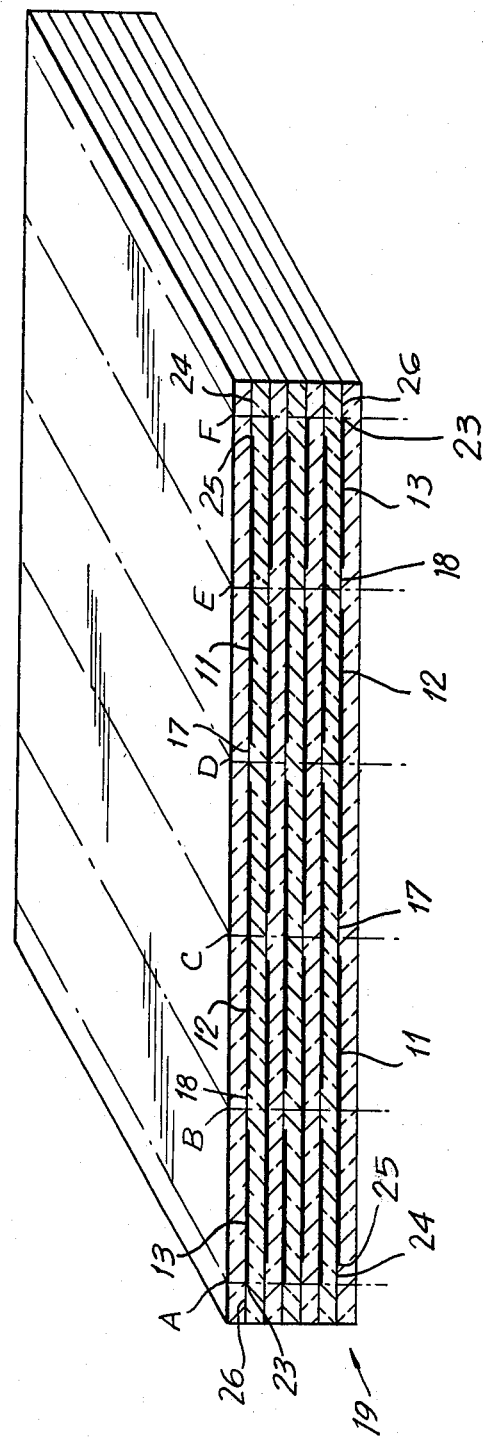

METHOD OF MAKING MARGINLESS MULTI-LAYER CERAMIC CAPACITORS

BACKGROUND OF THE INVENTION

1. Field of the Invention

The present invention is in the field of multi-layer ceramic capacitors, and more particularly relates to a method of making marginless multi-layer ceramic capacitors.

2. The Prior Art

The use of multi-layer ceramic capacitors is progressively increasing. In order to minimize the volume, it is highly desirable that ceramic capacitors have a maximum capacitance per unit area. Additionally, with the high cost of dielectric materials typically employed, e.g. ceramic materials having high dielectric constants, such as titanates, zirconates, stannates of the alkali earth metals, e.g. calcium, barium, strontium, and titanium, it is desirable to minimize the quantity of dielectric material employed.

A further desideratum is that the capacitors fabricated in a given run may be manufactured to have a predetermined desired capacitance value with minimal variations.

The methods heretofore used in the fabrication of multi-layer ceramic capacitors have been deficient in various aspects. More particularly, they have resulted in the production of capacitors having less than optimal capacitance to area ratio. Additionally, as will be more fully set forth hereinafter, the typical practice has been to fabricate capacitors of a value somewhat higher than necessary for a given application and thereafter erode the capacitors while measuring capacitance variations, to reduce the capacitance to a desired lower value.

By way of example, reference is made to U.S. Pat. Nos. 3,456,170 to Hatch and 3,394,386 to Weller.

Obviously, the fabrication of an over-size capacitor and the subsequent erosion thereof are wasteful of materials and labor and also result in the production of a capacitor whose overall dimensions are larger than required.

In accordance with typical manufacturing procedures for multi-layer ceramic capacitors, as exemplified for instance by U.S. Pat. Nos. 3,235,939 to Rodriguez, 3,992,761 to McElroy et al and 4,008,514 to Elderbaum, the prior art methods for manufacturing ceramic capacitors have resulted in the production of over-size capacitors for the reason that such methods involve the imprinting on the ceramic material of a multiplicity of discrete increments of electrode surrounded by uncovered areas or borders of ceramic. Plural sheets bearing the multiple electrode pattern are placed in registry and the resultant stack is punched or otherwise processed to sever capacitor blanks by cuts extending through the borders.

The fabricating method described and resultant product are disadvantageous in many aspects, including the waste of ceramic inherent in providing borders between electrodes and the fact that the overall dimensions of the finished product are enlarged by the size of the border material remaining, and that with a given ceramic body area, the electrode material does not cover the entire area, so that the resultant capacitance is not maximized.

To summarize, the prior art methods used in the fabrication of multi-layer ceramic capacitors have heretofore involved imprinting of relatively large sheets with a multiplicity of discrete electrode patterns, superimposition of such sheets, and severing of the sheets in the margin areas or borders between electrode patterns, thereby providing capacitors which have larger than necessary bulk due to the surrounding ceramic borders, and by reason of such borders do not maximize the possible capacitance of the unit, and for the same reason employ in their fabrication larger than necessary quantities of expensive ceramic material.

Where close electrical tolerances are required, it has been necessary to manufacture the ceramic capacitors oversized and thereafter reduce the capacitance value to achieve a unit having acceptable tolerance levels.

SUMMARY OF THE INVENTION

The present invention may be summarized as directed to a method of manufacturing a multi-layer ceramic capacitor which includes the steps of forming sheets of "green" ceramic material, imprinting, by silk screen or other techniques, the formed sheets with continuous elongate electrode areas or patterns, the dimensions of each of the electrode areas being a substantial multiple of the projected electrode width of a given capacitor to be formed, stacking a multiplicity of sheets of the type described in such manner as to provide alternate layers of electrode and ceramic, slicing said stacked sheets in a direction perpendicularly intersecting the elongated edges of the electrodes, whereby the sliced-away increments of the stack will include side edges each having the side edges of alternate electrodes exposed thereat (i.e. there will be no surrounding or projecting border), and first and second end edges, and each of the end edges will have all of the electrodes exposed. The resultant capacitor blank may be fired and terminated in conventional manner, with the termination connections being effected at each of the side edges.

The resultant capacitor, as is conventional, may thereafter be surrounded by a protective insulating coating, such as a glaze.

As will be perceived from the preceding description, practice of the method results in the formation of a capacitor which is essentially marginless. The term "marginless" as used herein is intended to relate to a construction in which the ceramic dielectric components of the capacitor, particularly at the end edges thereof, are essentially coterminous with the marginal edges of the electrodes, whereby all or substantially all of the area of the capacitor may be utilized to add to the capacitance value of the resultant unit.

In accordance with a variation of the method, marginless multi-layer ceramic capacitors are produced within close tolerance ranges without the necessity for post-formation capacitance adjustment, by forming a stack of sheets of material as described, i.e. alternately registering layers of electrode and ceramic, the electrodes being elongate as respects the ultimate width of a given capacitor, and with alternate electrodes being exposed at each side edge, severing an increment from the stack in a direction at right angles to the direction of elongation, firing and terminating the test increment, thereafter measuring the capacitance of the fired and terminated test increment, correlating the measured capacitance value with the dimension of the severed increment, and thereafter adjusting the dimension of increments severed from the remainder of the stack, as well as from additional stacks manufactured from the same green ceramic batch, in accordance with the desired capacitance value of the finished products.

In this manner it is possible to derive capacitors having values closely related to a preselected value.

As will be more fully understood from the ensuing description, numerous variations and refinements may be effected in the process without departing from the underlying principles thereof, such variations including the provision of a plurality of lengthwisely extending electrodes on each of the ceramic layers, and the cutting of the resultant stack in directions parallel with the axis of elongation of the electrodes as well as perpendicular thereto, the use of gang cutting or dicing devices for simultaneously separating a multiplicity of increments from the electrode bearing stack, the adjustment of a gang cutting or dicing device in accordance with the value of an increment separated from a given stack or from a stack forming one of a plurality of stacks fabricated from a given batch of ceramic material (the dielectric constant of which material may vary from batch to batch), the cutting of discrete increments from a fire electrode-ceramic block in directions perpendicular to the axis of elongation of the electrodes, etc.

From the foregoing it will be seen that it is an object of the present invention to provide a method of fabricating a multi-layer ceramic capacitor device having a maximum capacitance per unit area.

A further object of the invention is the provision of a method of making capacitors which results in the production of marginless capacitors.

Still a further object of the invention is the provision of a method of manufacturing capacitors of the type described wherein the individual capacitor units are formed with tolerance ranges closely approaching a desired value as a result of the formation of a sample capacitor and the adjustment of the dimensions of severed increments in accordance with the measured capacitance and width of the selected sample.

To attain these objects and such further objects as may appear herein or be hereinafter pointed out, reference is made to the accompanying drawings, forming a part hereof, in which:

FIG. 1 is a perspective view of a sheet of green ceramic prior to application of an electrode pattern;

FIG. 2 is a perspective view of the sheet of FIG. 1 with a representative example of an electrode pattern formed thereon;

FIG. 3 is a perspective view of a stack of the sheets shown in FIG. 2;

FIG. 4 is a perspective view of an increment severed from the stack of FIG. 3;

FIG. 5 is a perspective view of a representative example of a severed increment formed from the component illustrated in FIG. 4;

FIG. 6 is a schematic illustration of a further step in the manufacture of a tolerance-adjusted capacitor, being the measurement of the capacitance value of the increment of FIG. 5;

FIG. 7 is illustrative of a further step in the fabrication of the marginless capacitor device, illustrating the severance into segments of a capacitor preform;

FIG. 8 is a diagrammatic illustration of a dicing operation whereby a multiplicity of capacitor blanks are directly severed from the stack of electrode-imprinted green ceramic sheets;

FIG. 9 is a cross-sectional view illustrating the severance lines for dividing a stack of ceramic sheets as depicted in FIG. 3.

Turning now to the drawings, there is disclosed diagrammatically in FIG. 1 a sheet or layer 10 of green ceramic material, said sheet comprising an increment of predetermined length cut from a continuance strip, as is well known in the art. The green ceramic material may comprise any of a series of mixes from which the dielectric of ceramic capacitors is conventionally made. Without limitation, the mixture may comprise a barium titanate suspension within which has been embodied increments of organic polymeric marterial and plasticizing the mass to facilitate its further processing while in the "green" state.

Since the formulations and processing into sheets of selected thickness and width of the green ceramic, per se, forms no part of the present invention, further discussion thereof need not be undertaken. For purposes of reference, however, it may be noted that the compositions intended for extruding or casting, as referred to, are set forth in U.S. Pat. Nos. 3,004,197 and 3,235,939, and provide suitable dielectric paste compositions for use in accordance with the method of the present invention.

As shown in FIG. 2, the next step in the fabrication of a capacitor is to deposit the electrode forming components on a surface of the ceramic sheet 10. Illustratively, three electrode members 11, 12, 13 are deposited on the upper surface 14 of the ceramic sheet 10 by known techniques, such as screening or sputtering, for example.

It will be understood that the electrode components are applied to the ceramic sheet 10 in precisely oriented position relative to the marginal edges of the ceramic sheet 10 so that superimposition of a multiplicity of ceramic sheets 10 relative to each other will concomitantly orient or position the electrode portions of the alternate layers.

The electrode pattern embodied in FIG. 2 is illustrated and described by way of preferred example. However, it will be readily recognized that other electrode patternings may be suitably employed.

In accordance with the illustrated embodiment, the electrodes 11 and 12 are continuous strips having the length or distance L corresponding to the major transverse extent of the ceramic sheet 10, with the exception of end marginal portions 15, 16.

The electrode 13 in the illustrated pattern is of a width W, which is precisely one half the width W' of the electrodes 11 and 12. The electrodes 11, 12, 13 are offset by spacing margins or borders 17 and 18. The distance L, being the length of the electrodes, is selected to comprise a major multiple of the anticipated width of the finally fabricated capacitor. By way of example, typically the distance L is about ten or more times the anticipated ultimate capacitor width.

A plurality of ceramic sheets 10, bearing the electrode pattern as noted, are assembled one atop the other, as represented by the illustrations FIGS. 3 and 9. As will be apparent from the said illustrations, the stacking is effected in such manner that the electrode layers alternate with ceramic layers. Additionally, the half-width electrode 13 of each alternate layer of the stack 19 is disposed at an opposite edge of the stack.

The thus stacked electrode bearing sheets 20 are preferably overlaid with a capping sheet 21 of green ceramic free of electrode.

As will be apparent from FIGS. 4 and 9, a series of capacitor preforms 22 may readily be fabricated from the stack 19 by removing the end margins 15, 16 and by severing the stack along cutting lines A, B, C, D, E and F. The cutting lines A and F are positioned to coincide with the longitudinal marginal edges 23 of the electrodes 13 and remove the margins 24, 26.

The border portion or margin 24 outwardly of the longitudinal marginal edge 25 of electrode 11 is of greater width than the border portion or margin 26 outwardly of the margin 23 of electrode 13. By virtue of this differential spacing, it will be apparent, particularly from an inspection of FIG. 9, that the cutting lines A and F expose along the cut lines, the marginal edges 23 of electrodes 13 but the marginal edges 25 of electrode 11 are recessed a distance inwardly of the lines A and F.

Cutting line B is positioned substantially centrally between the half-width electrode 13 and the adjacent electrode 12. As is evident from FIG. 9, the cut formed at B will result in the exposure at the formed edge, of edge portions of alternate layers of the electrode 11 but will pass through the border 18 between electrodes 12 and 13.

It will thus be seen that the capacitor preform 22 has exposed along the opposed longitudinal marginal edges thereof edges of the electrodes of each alternate layer.

In similar fashion, the cuts C,D and E will sever from the block, capacitor preforms 22, all of which capacitor preforms are essentially identical in all respects.

It will be recognized by those skilled in the art that the electrode patterning procedure described by way of illustration is but one of many possible electrode arrangements.

Referring now to FIG. 7, it will be perceived that as a result of the steps heretofore noted there is provided a capacitor preform 22 having a first set or series of electrodes H having their elongated marginal edges 28 exposed at edge 30 of the preform and a second set or series of electrodes H' having their elongated marginal edges 29 exposed at edge or side 31 of the preform.

The succeeding operations in accordance with the method are intended to fabricate from the preform 22 and from a similar batch of preforms, completed capacitors preferably having values which closely approach a preselected or predetermined value.

In accordance with a preferred method, an increment or section 33 is severed from the preform 22, for example along severance lines 32, perpendicular to the marginal edges 30, 31 of the preform and perpendicular to the surfaces of the ceramic and electrodes.

The increment 33, which is shown diagrammatically in FIG. 5, may next be fired and terminated in conventional manner and subjected to a capacitance measurement, as further diagrammatically illustrated in accordance with FIG. 6. In such figure, the electrodes H' have been electrically connected to termination layer 34 whereas electrodes H are electrically connected to termination layers 35.

The firing and application of terminations to the exposed electrode ends constitute procedures well known per se and forms no part of the present invention.

It will be understood that the capacitative value of the terminated device 36 is a function of the overlapping area of the electrodes H, H'. Since the lengthwise dimension 37 of the increments 22 is a constant, it will be understood that the capacitive value is a function directly of the width 38 of the increment 33 severed from the preform 22. It is accordingly possible to achieve a desired capacitance within a range by measuring the capacitance of the finished capacitor 36 and then adjusting the width 38 of the cuts to be formed in the preform 22 as a function of the desired end capacitance.

Further, since the dielectric constant of a given batch of dielectric material after firing will virtually be unchanged throughout the entirety of such batch, it is feasible to produce capacitors from the preforms 22 which are virtually identical in value and conform to a preselected value by adjusting the dimension 38 as a function of the measured capacitance of the capacitor 36. Accordingly, the other preforms from a given batch of green ceramic and formed in the manner hereinabove defined may be severed along parallel planes 39, 40, 41, 42, 43, 44, 45, to provide increments having predictable predetermined capacitance value after firing.

The increments are fired and terminated and thereafter glazes in accordance with known practice.

It will be observed that the resultant capacitors are "marginless" as hereinabove defined.

It will be readily recognized from the foregoing description that various alternative means of producing marginless capacitors from the stack 19 will readily suggest themselves. By way of example, there is diagrammatically illustrated in FIG. 8 a dicing mechanism 46 which includes a border or frame 47 and an internal series or grid of variably spaceable cutter knives 48, 49. The perimeter of the border 47 is sized to correspond with the external dimensions of the stack 19 or of the margins of the outermost electrodes thereon.

The knives 48, 49, of which at least the knives 49 are preferably adjustably spaced, function simultaneously to form increments 33 from the stack 19 without the necessity for providing an intermediate preform 22.

The adjustment of the knives 49 is preferably effected for each batch in accordance with the capacitance constant derived, as illustrated in FIG. 6, as a result of severing a single increment from a sample stack 19 or preform 22 formed from that batch.

Numerous other variations on the finishing-to-value steps may be made without departing from the spirit of the invention.

For instance, it is possible to fire and terminate an entire preform 22, measure the capacitance of the preform, and determine the spacing of the severance planes 39, 40, 41, etc. in accordance with the total capacitance value of the entire preform.

Additionally, it is feasible to cut fired preforms into increments for subsequent termination, the spacing of the cutting steps to be determined as above. However, it is preferable to cut prior to rather than subsequent to firing in view of the greater facility and accuracy with which such cuts may be made, and the fact that cutting after firing results in substantial material losses.

From the foregoing it will be understood that there is provided a method or methods for manufacturing marginless capacitors, preferably to value, which eliminate wastage of the ceramic and electrode material and which produce capacitors of the smallest possible size for a given capacitance value.

In accordance with the method it is feasible to obtain capacitors to close tolerance without resort to wasteful, expensive and labor-intensive methods heretofore employed for such purpose, namely, fabricating an oversize capacitor and subsequently removing increments of ceramic and electrode while monitoring the progressive decreasing capacitance of individual capacitors.

Numerous variations in details of the steps and the sequence of their performance may occur to those skilled in the art and familiarized with the instant disclosure. Accordingly, this invention is to be broadly construed within the scope of the appended claims.

Having thus described the invention and illustrated its use, what is claimed as new and is desired to be secured by Letters Patent is:

1. The method of making a marginless multi-layer ceramic capacitor comprising the steps of forming a plurality of sheets of green ceramic, depositing on each of said sheets an electrode pattern comprising at least one elongate, rectangular, continuous strip of electrode material, the length of said strip being a major multiple of the projected electrode width of a finished capacitor, superimposing a plurality of said electrode bearing sheets to form a stack having alternate parallel layers of electrode and ceramic, such that the longitudinal edges of the electrode strips of alternate sheets are in alignment and the longitudinal edges of the electrode strips of adjacent sheets are in staggered relation, severing increments of said stack transversely of the length thereof along severance lines, each said severance line defining the borders of two adjacent marginless capacitor blanks, and firing and terminating said capacitor blanks.

2. The method in accordance with claim 1 and including the step of severing a first measured increment from said stack, firing and terminating said first increment, measuring the capacitance of said fired and terminated increment, and thereafter severing the remainder of said stack along spaced transverse planes, the spacing of said planes being adjusted as a function of the capacitance of said fired and terminated first increment, thereby to provide capacitors of predicted desired value.

3. The method of making a marginless multi-layer capacitor comprising the steps of forming a plurality of sheets of green ceramic, depositing on each of said sheets an electrode pattern comprising a plurality of elongate spaced parallel rectangular continuous strips of electrode material, the length of each strip being a major multiple of the projected electrode width of a finished capacitor, superimposing a plurality of said electrode bearing sheets to form a stack having alternate parallel layers of electrode and ceramic, such that the longitudinal edges of the electrode strips of alternate sheets adjacent one of the longitudinal edges thereof are in alignment and the longitudinal edges of the electrode strips of adjacent sheets adjacent the other longitudinal edge of the sheets are in staggered relationship, severing the stack along spaced parallel planes parallel to the length of said electrode strips to define a plurality of elongated stack blanks, each having the longitudinal edges of the electrode strips of alternate sheets along one longitudinal edge of the elongated stack blank in alignment and exposed and the longitudinal edges of the electrode strips of adjacent sheets along the other longitudinal edge of the elongated stack blank in staggered relation, severing increments of said elongated stack blank transversely of the length thereof to define marginless capacitor blanks, and firing and terminating said capacitor blanks.

4. The method of making a marginless multi-layer capacitor comprising the steps of forming a plurality of sheets of green ceramic, depositing on each of said sheets an electrode pattern comprising a plurality of elongate spaced, parallel, rectangular, continuous strips of electrode material, the length of each strip being a major multiple of the projected electrode width of a finished capacitor, the width of the electrode strip adjacent one of the longitudinal edges of the sheet being approximately one half the width of the other electrode strips on the sheet, superimposing a plurality of said electrode bearing sheets to form a stack having alternate parallel layers of electrode and ceramic, with the half-width electrode strip being positioned alternately adjacent each of the longitudinal edges of the stack, such that the longitudinal edges of the electrode strips of alternate sheets are in alignment and the longitudinal edges of the electrode strips of adjacent sheets are in staggered relation, severing the stack along spaced parallel planes substantially midway of the space between the half-width electrode strip and the next adjacent electrode strip and midway of the full width electrode strip, to define a plurality of elongate stack blanks, each having the longitudinal edges of the electrode strips of alternate sheets along one longitudinal edge of the elongated stack blank in alignment and exposed and the longitudinal edges of the electrode strips of adjacent sheets in staggered relation, severing increments of each of said elongated stack blanks transversely of the length thereof to define marginless capacitor blanks, and firing and terminating said capacitor blanks.

5. The method in accordance with claim 4 wherein the electrode patterns are formed on each sheet so as to be spaced from all the edges thereof to define margins, and the stack is severed to remove such margins to expose the edges of the electrodes at the ends of said longitudinal strips of electrode material, and to expose the longitudinal edges of the half-width electrodes adjacent the side edges of said sheets.

6. The method in accordance with claim 4 wherein the steps of severing parallel to said longitudinal edges and severing increments of said stack are carried out simultaneously.

* * * * *